(12) United States Patent
Abe et al.

(10) Patent No.: US 7,314,231 B2
(45) Date of Patent: Jan. 1, 2008

(54) KNEE-BAG MODULE

(75) Inventors: Kazuhiro Abe, Berlin (DE); Masayoshi Kumagai, Shiga (JP)

(73) Assignee: Takata Corporation, Tokyo (JP)

( * ) Notice: Subject to any disclaimer, the term of this patent is extended or adjusted under 35 U.S.C. 154(b) by 184 days.

(21) Appl. No.: 11/108,752

(22) Filed: Apr. 19, 2005

(65) Prior Publication Data

US 2005/0230939 A1   Oct. 20, 2005

(30) Foreign Application Priority Data

Apr. 20, 2004   (JP)   ............................. 2004-124416

(51) Int. Cl.
   *B60R 21/22*   (2006.01)

(52) U.S. Cl. .................... 280/730.1; 280/740; 280/752

(58) Field of Classification Search ................ 280/736, 280/741, 730.1, 732, 731, 740, 752
See application file for complete search history.

(56) References Cited

U.S. PATENT DOCUMENTS

2003/0120409 A1*   6/2003   Takimoto et al. ............. 701/45

* cited by examiner

*Primary Examiner*—Paul N. Dickson
*Assistant Examiner*—Robert A. Coker
(74) *Attorney, Agent, or Firm*—Manabu Kanesaka

(57) ABSTRACT

A knee-bag module includes a knee-bag to be inflated in front of a leg portion of a vehicle occupant and an inflator for ejecting gas from a gas outlet thereof to inflate the knee-bag. The inflator is a pyro-type inflator for ejecting only reactant gas.

11 Claims, 7 Drawing Sheets

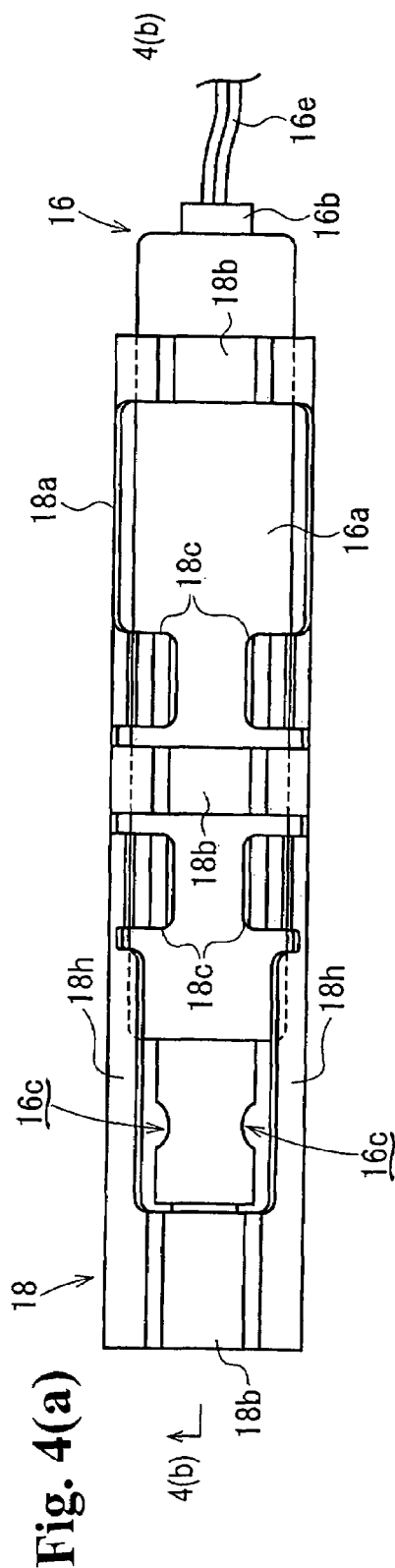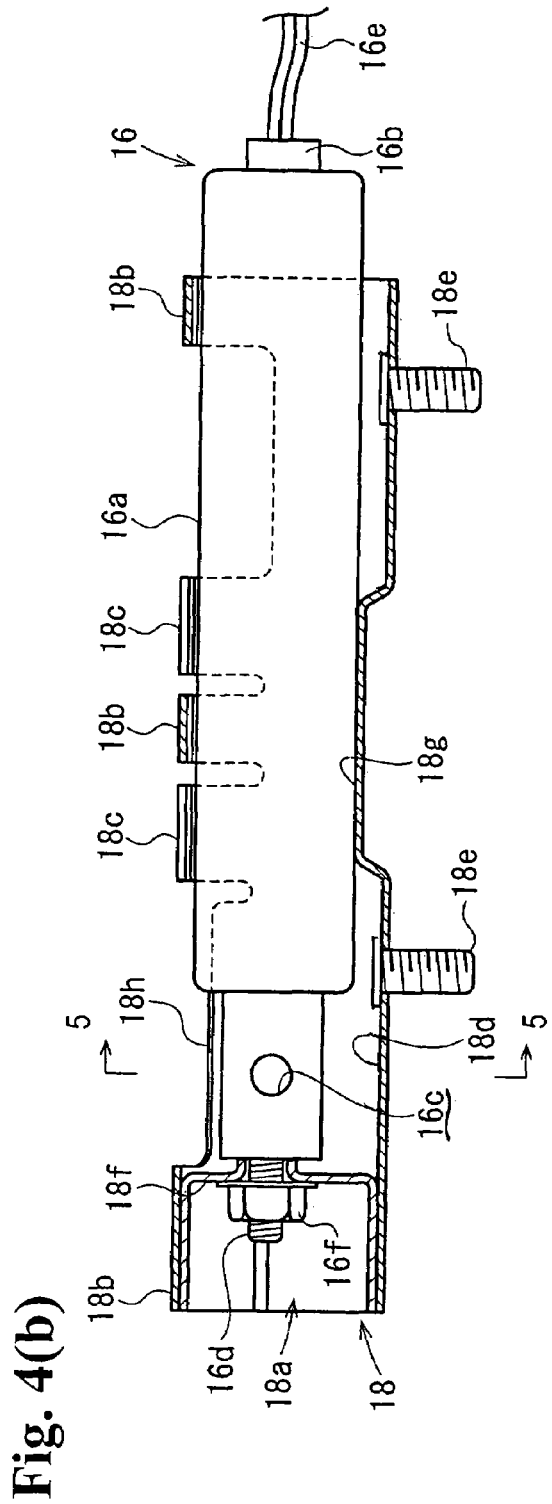

KNEE-BAG MODULE

BACKGROUND OF THE INVENTION AND RELATED ART STATEMENT

The present invention relates to a knee-bag module for inflating an airbag (knee-bag) in front of a leg portion of an occupant sitting in a vehicle seat with an inflator to protect the leg portion upon a vehicle collision.

In a knee-bag module formed of a knee-bag and an inflator for inflating the knee-bag, a hybrid inflator has been widely used (see Japanese Patent Publication (Kokai) No. 2003-170800). The hybrid inflator is formed of a high-pressure tank containing high-pressure gas, a gas generator, and an igniter. When the gas generator is ignited, the generated gas increases a pressure in the high-pressure tank to break a sealing member at an outlet of the high-pressure tank for ejecting a mixture of the high-pressure gas and the generated gas from a gas nozzle. The hybrid inflator can promptly inflate the knee-bag with a high gas pressure.

When the high-pressure gas is mixed with the generated gas of the gas generator, a temperature of the mixed gas decreases as opposed to a pyro-type inflator in which only reactant gas is ejected from a gas generator, thereby alleviating heat resistance of a knee-bag. However, the hybrid inflator has the high-pressure tank, thereby increasing a size and weight.

In view of the problem described above, an object of the present invention is to provide a knee-bag module having an inflator with a smaller size and lighter weight as compared with the hybrid inflator.

Further objects and advantages of the invention will be apparent from the following description of the invention.

SUMMARY OF THE INVENTION

In order to attain the objects described above, according to a first aspect of the present invention, a knee-bag module includes a knee-bag to be inflated in front of a leg portion of a vehicle occupant and an inflator for ejecting gas from a gas outlet thereof to inflate the knee-bag. The inflator is a pyro-type inflator for ejecting only reactant gas of a gas generator.

According to a second aspect of the present invention, in the knee-bag module in the first aspect, the knee-bag includes a flameproof cloth or a patch cloth attached to a portion of the knee-bag receiving thermal and mechanical loads.

According to a third aspect of the present invention, in the knee-bag module in one of the first and second aspects, the inflator is fitted into an inflator holder having a plate facing the gas outlet of the inflator.

According to a fourth aspect of the present invention, in the knee-bag module in the third aspect, the inflator includes two gas outlets facing in opposite directions, and the plate includes a pair of plates sandwiching the inflator therebetween.

According to a fifth aspect of the present invention, in the knee-bag module in one of the first to fourth aspects, the inflator is structured such that when gas is ejected within a closed tank with a normal-pressure and a volume of 1 ft$^3$, an internal pressure of the tank becomes 35 to 65 kPa after 5 mili-seconds and 175 to 245 kPa after 15 mili-seconds, and a maximum internal pressure is 240 to 300 kPa.

In the present invention, the knee-bag module is the pyro-type inflator with a small size and light weight as the inflator, thereby reducing a size and weight of the knee-bag module. The pyro-type inflator ejects gas with a temperature higher than that of a hybrid inflator. Accordingly, it is preferable that a part of the knee-bag subjected to thermal and mechanical loads during inflation of the knee-bag is provided with the flameproof cloth or the patch cloth for reinforcement.

The plate facing the gas outlet is provided so that gas ejected from the gas outlet does not directly contact an inner surface of the knee-bag. The plate is provided in the inflator holder, so that it is possible to arrange the plate at a predetermined position facing the gas outlet without a separate member for attaching the plate.

The inflator may have the two gas outlets facing in opposite directions, and a pair of the plates faces the gas outlets. Accordingly, gas ejected from the gas outlets impinges on the plates to change a direction, and is guided into the knee-bag.

The inflator is structured such that when gas is ejected within a closed tank with a normal-pressure and a volume of 1 ft$^3$, an internal pressure of the tank becomes 35 to 65 kPa after 5 mili-seconds and 175 to 245 kPa after 15 mili-seconds, and a maximum internal pressure is 240 to 300 kPa. When such an inflator is used, it is possible to promptly deploy the knee-bag in front of a leg portion for receiving the leg portion, thereby absorbing an impact applied to the leg portion.

BRIEF DESCRIPTION OF THE DRAWINGS

FIGS. 4(*a*) and 4(*b*) are a front view and a sectional view of the inflator and the inflator holder, respectively;

DETAILED DESCRIPTION OF PREFERRED EMBODIMENTS

Figure 1:
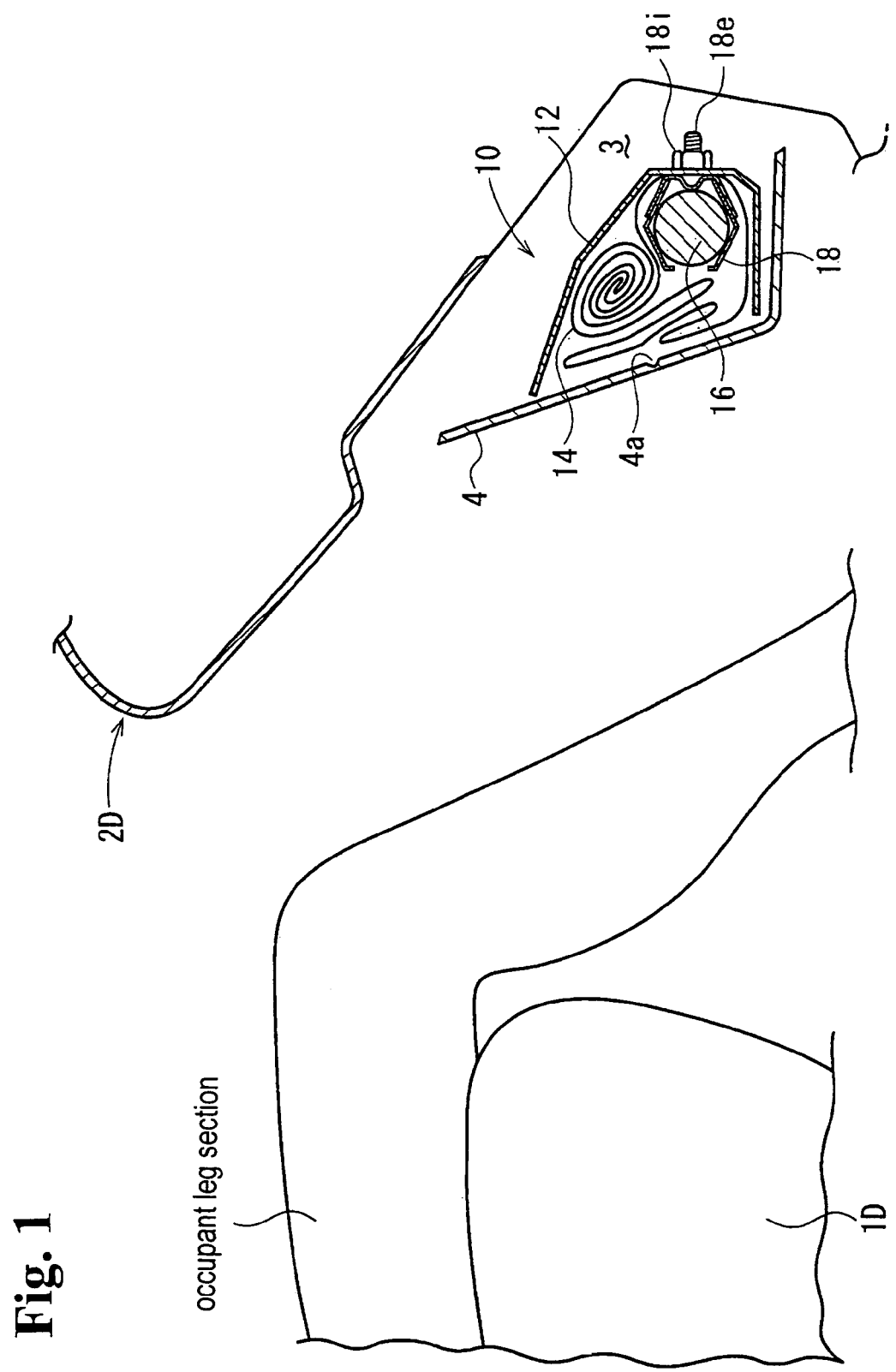
FIG. 1 is a longitudinal sectional view of a front portion of a driver seat and a knee-bag module according to an embodiment of the present invention in a non-inflation state of a knee-bag.
Figure 2:
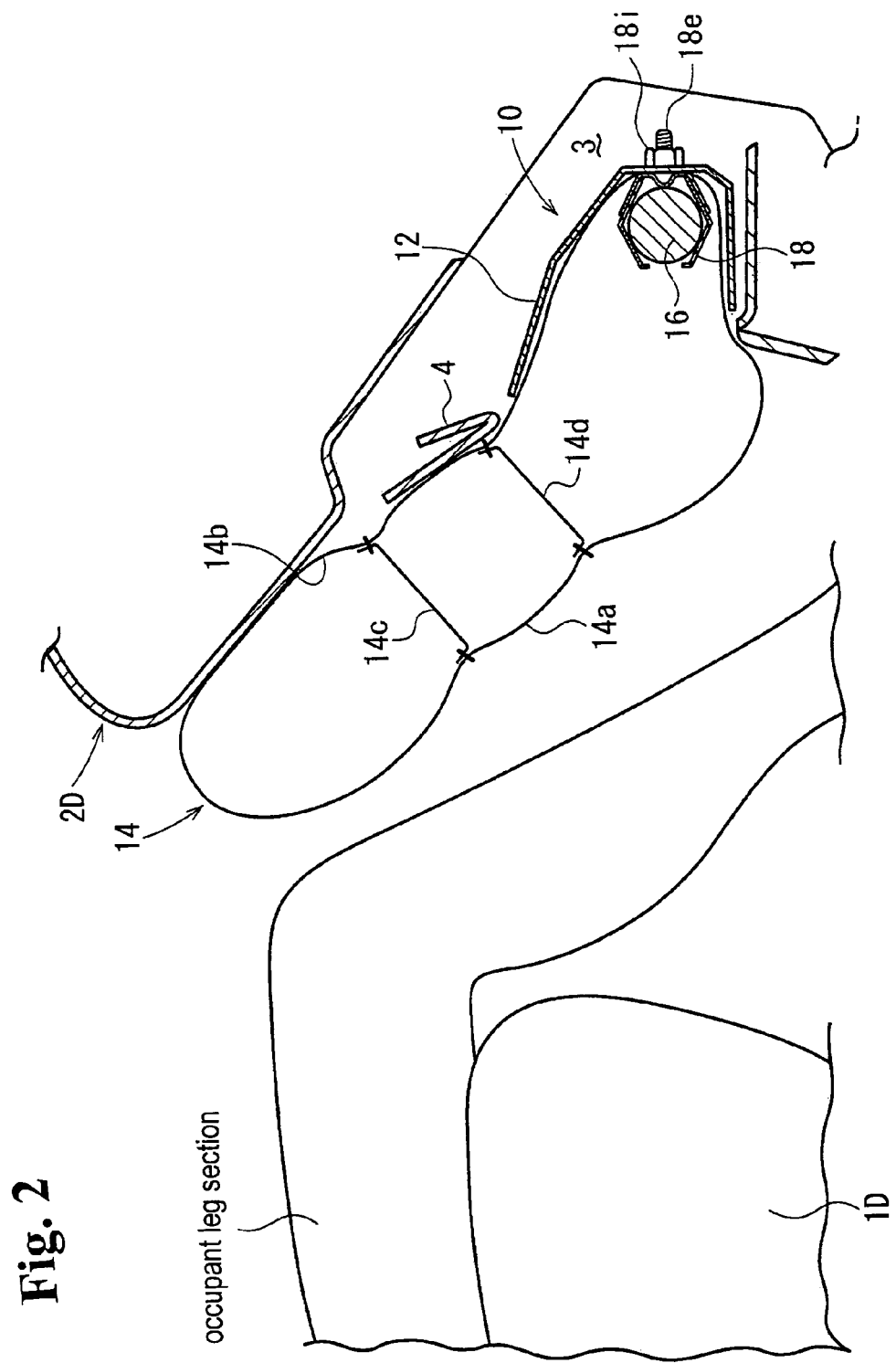
FIG. 2 is a longitudinal sectional view of the knee-bag module shown in FIG. 1 during inflation of the knee-bag.
Figure 3:
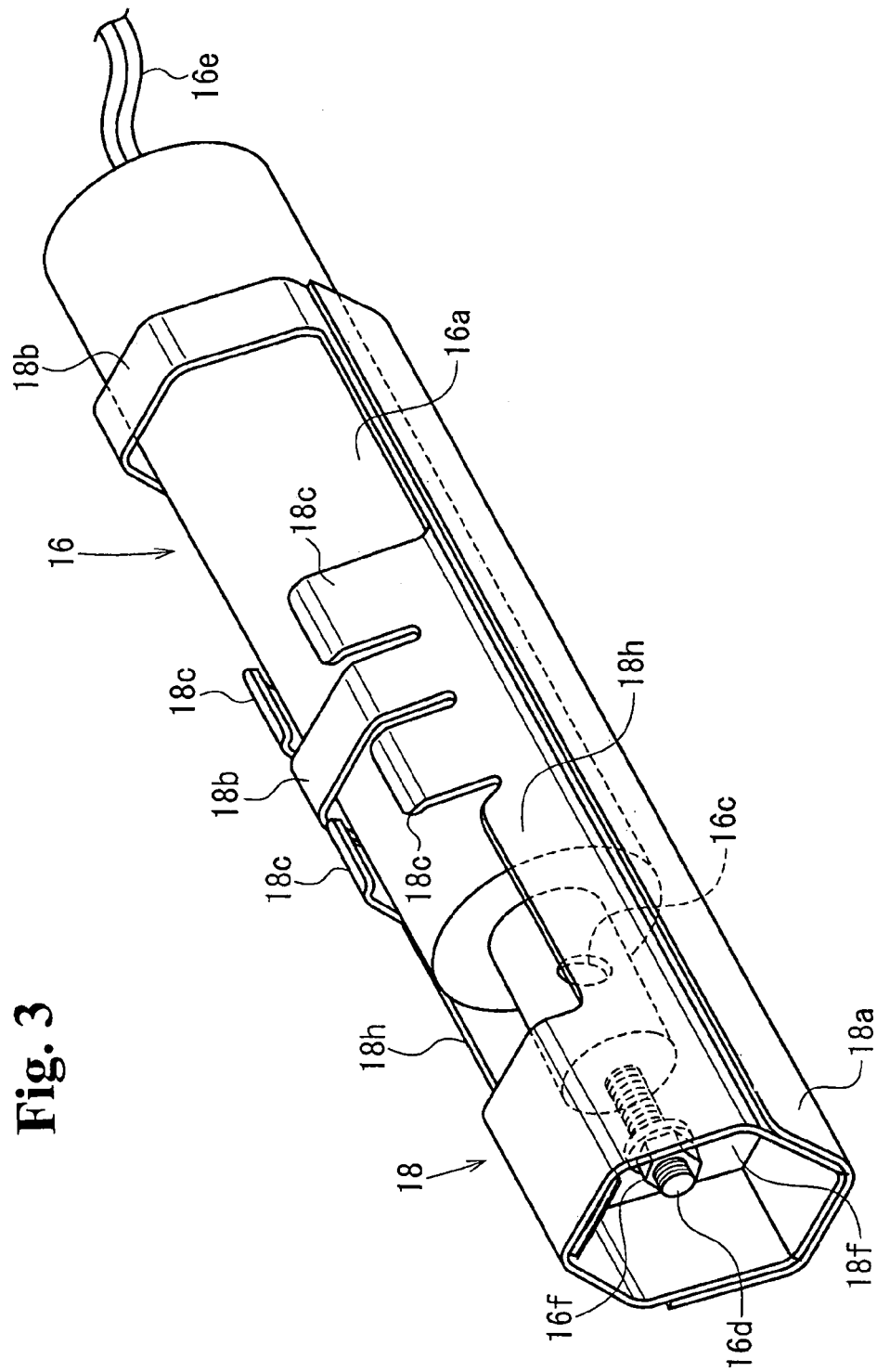
FIG. 3 is a perspective view of an inflator and an inflator holder.
Figure 5:
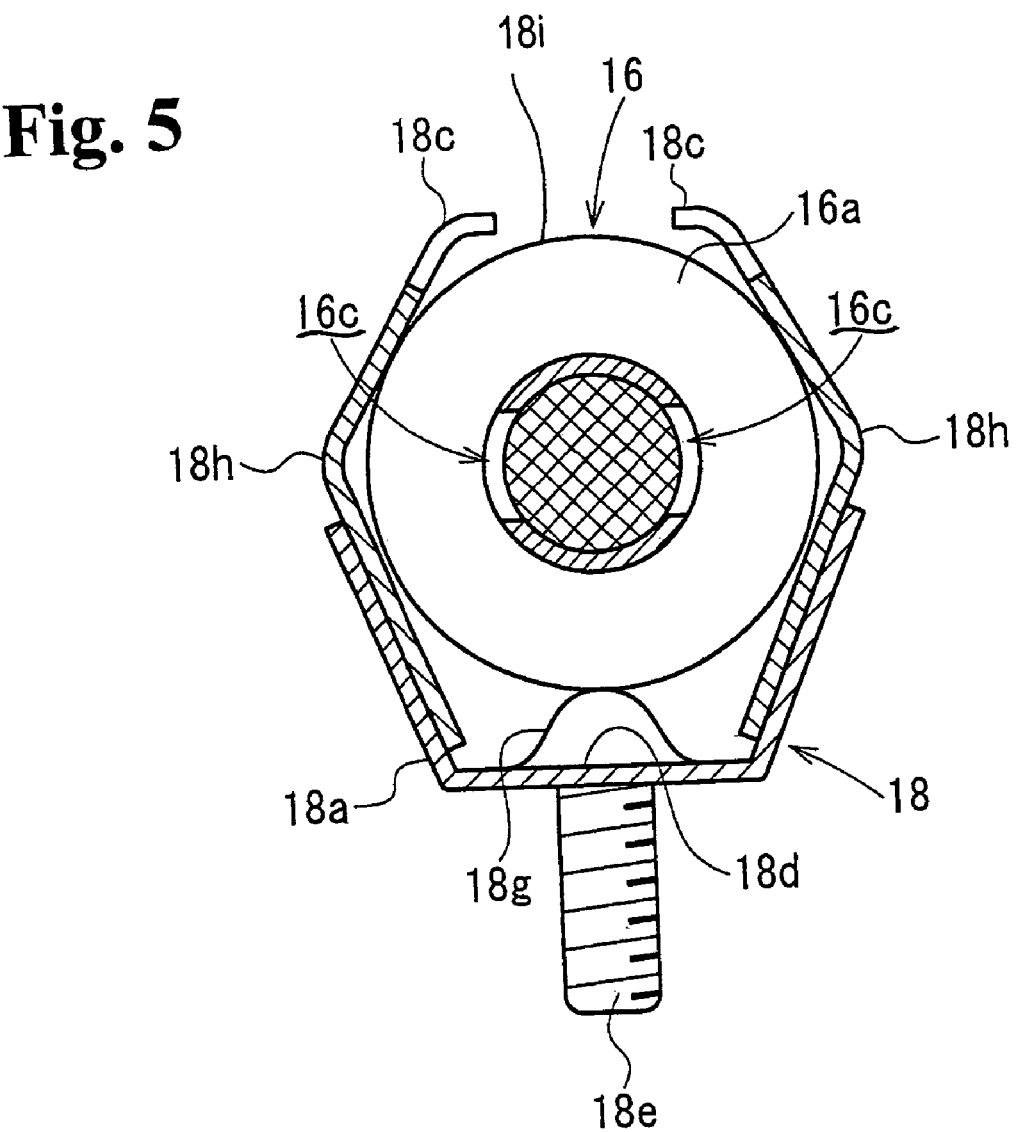
FIG. 5 is a sectional view taken along line 5-5 in FIG. 4(*b*)
Figure 6:
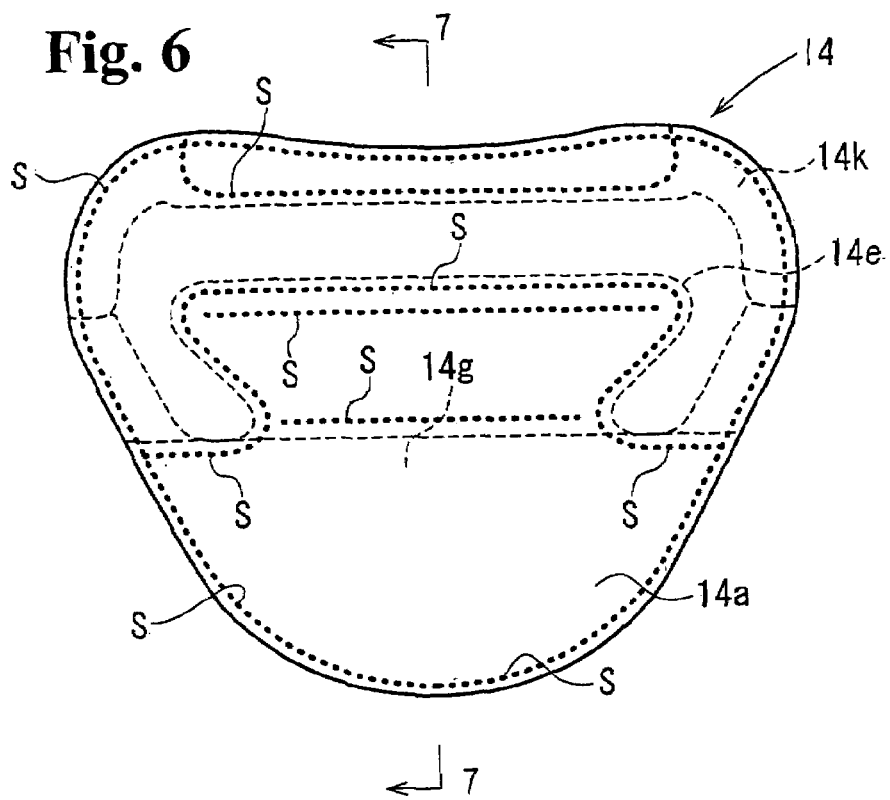
FIG. 6 is a front view of the knee-bag.
Figure 7:
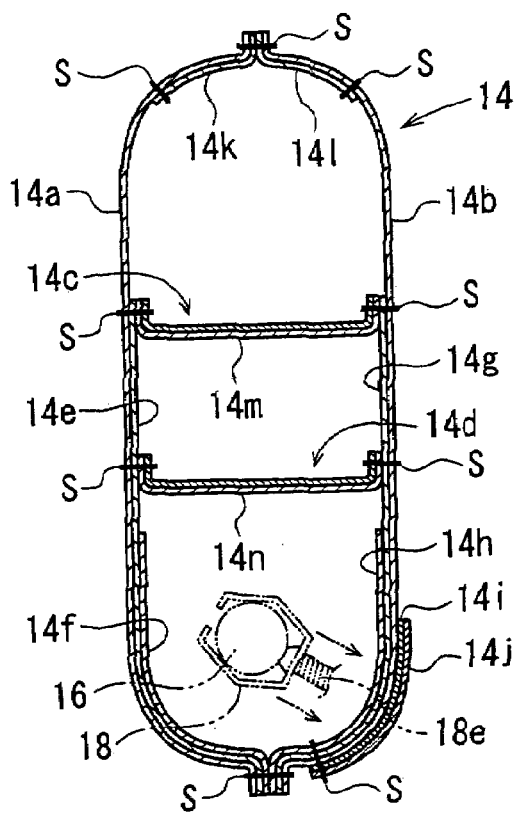
FIG. 7 is a sectional view taken along line 7-7 in FIG. 6.

Hereunder, embodiments of the present invention will be described with reference to the accompanying drawings. FIGS. 1 and 2 are longitudinal sectional views of a front portion of a driver seat and a knee-bag module according to an embodiment of the present invention. FIG. 1 shows a non-inflated state of the knee-bag, and FIG. 2 shows an inflated state thereof. FIG. 3 is a perspective view of an inflator and an inflator holder of the knee-bag module. FIG. 4(*a*) is a front view of the inflator and the inflator holder. FIG. 4(*b*) is a sectional view taken along line 4(*b*)-4(*b*) in FIG. 4(*a*). FIG. 5 is a sectional view taken along line 5-5 in FIG. 4(*b*). FIG. 6 is a front view of a knee-bag. FIG. 7 is a sectional view taken along line 7-7 in FIG. 6.

According to an embodiment of the present invention, a knee-bag module 10 is placed in a lower section of a driver seat instrument panel 2D arranged in front of a driver seat 1D of a vehicle. The knee-bag module 10 includes a container-shaped retainer 12 with a front opening (facing an occupant); a knee-bag 14 connected to the retainer 12; an inflator (gas generator) 16 for inflating the knee-bag 14; and an inflator holder (a holder) 18 for holding the inflator 16.

According to the present invention, the inflator 16 is a pyro-type inflator for ejecting only reactant gas from a gas generator. A recess 3 is provided in the lower section of the driver seat instrument panel 2D (below a steering column cover) for retaining the knee-bag module, so that the retainer 12 is placed in the recess 3. In a normal state (not in an emergency state such as a head-on vehicle collision), the knee-bag 14 is accommodated within the retainer 12 in a folded state. A lower instrument panel 4 covers the front opening and the recess 3 of the retainer 12. When the knee-bag 14 is inflated from the state shown in FIG. 1 to the state shown in FIG. 2, a portion of the lower instrument panel 4 covering the front opening of the retainer 12 is torn by a pressing force of the knee-bag 14.

Reference numeral 4a denotes a tear line for promoting cleavage of the lower instrument panel 4.

As shown in FIG. 1, the retainer 12 is positioned substantially lower than a top surface of the driver seat 1D. When the inflator 16 is actuated, the knee-bag 14 pushes and opens the lower instrument panel 4, and is inflated upwardly inside a cabin along a front surface of the lower instrument panel 4 and a bottom surface of the steering column cover. As shown in FIG. 2, an upper portion of the knee-bag 14 in the fully-inflated state faces knees of an occupant in the driver seat.

As shown in FIG. 6, the knee-bag 14 (in the width direction of a vehicle) has a lateral width decreasing toward a lower end thereof from an intermediate point in the vertical direction. As shown in FIG. 7, the knee-bag 14 is formed in a bag shape by sewing together edges of a front panel 14a facing the occupant and edges of a rear panel 14b facing the instrument panel 2D. Reference symbol S denotes a seam of the sewing.

The knee-bag 14 is provided with tethers 14c and 14d connecting the front panel 14a and the rear panel 14b together at middle points in the vertical direction in multi-levels (two levels in the embodiment). The tethers 14c and 14d extend laterally so as to connect the front panel 14a to the rear panel 14b over a predetermined lateral width. Both ends of the tethers 14c and 14d are away from both sides of the knee-bag 14 to form a vent space therebetween.

As shown in FIG. 2, the inflator 16 is arranged in the knee-bag 14. The inflator holder 18 holds the inflator 16, and fixes a lower end of the rear panel 14b to the retainer 12 from inside the knee-bag 14.

A reinforcing cloth such as a flameproof cloth or a patch cloth is attached to the knee-bag 14 at a portion thereof receiving thermal and mechanical loads of gas ejected from the inflator 16. More specifically, reinforcing cloths 14e and 14f are attached to a lower internal surface of the front panel 14a facing the inflator 16 to be multi-layered (two-layer in the embodiment), and reinforcing cloths 14g and 14h are attached to a lower internal surface of the rear panel 14b to be multi-layered (two-layer). The reinforcing cloths 14e to 14h extend to peripheries of the front panel 14a and the rear panel 14b so as to reinforce the connected portion thereof.

Among the reinforcing cloths 14e to 14h, as shown in FIG. 7, the reinforcing cloths 14e and 14g directly overlapping the front panel 14a and the rear panel 14b extend to a height of connected portions of the upper tether 14c, the front panel 14a, and the rear panel 14b, thereby reinforcing the connected portions of the tethers 14c and 14d, the front panel 14a, and the rear panel 14b.

Reinforcing cloths 14i and 14j are attached to an external surface of the rear panel 14b at the lower end thereof to be multi-layered (two layer in the embodiment), where the inflator holder 18 is fixed to the retainer 12. Reinforcing cloths 14k and 14l are provided along upper-half peripheries of the front panel 14a and the rear panel 14b, respectively. The reinforcing cloths 14k and 14l reinforce the connected portion of the upper-half peripheries of the front panel 14a and the rear panel 14b. The tethers 14c and 14d are provided with reinforcing cloths 14m and 14n.

In the embodiment, the inflator 16 is formed of a cylindrical casing 16a filled with a gas generator. A squib (igniter) 16b is provided at one end (rear end) of the casing 16a for igniting the gas generator. As shown in FIGS. 4(a), 4(b), and 5, two gas nozzles or outlets 16c are formed at the other end (far end) of the casing 16a, and face in opposite directions intersecting an axial direction of the casing 16a. The casing 16a has a distal end with a smaller diameter, and the gas nozzles 16c and 16c are formed in a peripheral surface of the distal end. A bolt 16d protrudes from an end face of the distal end, so that the inflator 16 is attached to the holder 18. Reference numeral 16e denotes a harness for turning on the squib 16b.

In the embodiment, it is preferred that the inflator 16 is structured such that when gas is ejected within a closed tank with a normal-pressure and a volume of 1 ft$^3$, an internal pressure of the tank becomes 35 to 65 kPa after 5 mili-seconds and 175 to 245 kPa after 15 mili-seconds, and a maximum internal pressure is 240 to 300 kPa.

The inflator holder 18 includes a body 18a having a rectangular section in a direction intersecting a longitudinal direction; arch sections 18b straddling both sides of the body 18a; inflator push pieces 18c protruding from the sides of the body 18a; and stud bolts 18e protruding from a bottom surface (base 18d) of the body 18a downwardly in FIG. 4(b). The arch sections 18b are arranged at a left end, a right end, and an intermediate portion of the body 18a as shown in FIG. 4(b). The arch section 18b at the left end is closed with a closing wall 18f. The closing wall 18f is provided with a bolt insertion hole (reference numeral abbreviated) for inserting the bolt 16d protruding from the end face of the inflator 16 (casing 16a).

The inflator 16 is fitted into the holder 18, and sequentially passes through the arch sections 18b at the right end and the intermediate portion of the body 18a from the distal end. The bolt 16d protruding from the end face of the inflator 16 is inserted into the bolt insertion hole of the closing wall 18f at the left end of the body 18a shown in FIG. 4(b) so as to extend outwardly. The inflator 16 and the holder 18 are connected together by fastening a nut 16f to the bolt 16d.

The base 18d forms a bottom surface of the body 18a in FIG. 4(b), and is provided with a convex step portion 18g protruding upwardly toward inside the holder 18. The inflator 16 fitted into the holder 18 abuts against the convex step portion 18g to be away from the base 18d. As shown in FIG. 5, the push pieces 18c and 18c protruding from the sides of the body 18a are bent to approach each other, and abut against side surfaces of the inflator 16 from above to push the inflator 16 against the convex step portion 18g.

As shown in FIG. 5, a portion of the body 18a surrounding the distal end of the inflator 16, where the gas nozzles 16c and 16c are provided, has a U-shape section formed of the base 18d and a pair of sidewalls 18h and 18h protruding from both sides of the base 18d to open upwardly. The inflator 16 is provided with the gas nozzles 16c facing in opposite directions and the sidewalls 18h and 18h, respectively. The sidewalls 18h and 18h form plate portions facing the gas nozzles 16c and 16c of the inflator 16, respectively. Accordingly, gas ejected from the gas nozzles 16c in the opposite directions impinges on the sidewalls 18h and 18h to change the directions upwardly in FIG. 5, and is guided into the knee-bag 14 through a front opening 18i.

The inflator 16 held in the holder 18 is arranged within the knee-bag 14 such that a longitudinal direction of the inflator 16 is aligned laterally. The base 18d of the holder 18 contacts the lower end of the inner surface of the rear panel 14b of the knee-bag 14. At this time, the stud bolts 18e protruding from the base 18d are inserted into bolt insertion holes (not shown) of the rear panel 14b so as to protrude backward (opposite to an occupant), and are further inserted into bolt insertion holes (not shown) of the retainer 12. Then, by fastening nuts 18f to the stud bolts 18e, the holder 18 is fixed to the retainer 12 while the lower end of the rear panel 14b is clamped between the holder 18 and the retainer 12.

When a vehicle having the knee-bag module 10 described above is in a frontal collision, the inflator 16 is activated for ejecting gas, so that the knee-bag 14 starts to be inflated with gas from the inflator 16. The knee-bag 14 pushes the lower instrument panel 4 to open, and is expanded inside a cabin upwardly along the front surface of the lower instrument panel 4 and the bottom surface of the steering column cover. The upper portion of the inflated knee-bag 14 faces and receives knees of an occupant.

According to the present invention, the inflator 16 is a pyro-inflator for ejecting only reactant gas of the gas generator, and has a smaller size and lighter weight as compared with a hybrid-inflator, thereby reducing a size and weight of the knee-bag module 10. Accordingly, the knee-bag module 10 can be arranged in a small space such as a lower side of the steering column cover.

When the inflator 16 is actuated to eject gas, gas with a relatively high-temperature is ejected from the gas nozzles 16c. The reinforcing cloths 14e to 14h formed of a flameproof cloth or a patch cloth are attached to portions of the knee-bag 14 subjected to thermal and mechanical loads, so that the knee-bag 14 has sufficient heat resistance and strength. In the knee-bag module 10, the gas nozzles 16c face the sidewalls 18h of the inflator holder 18, so that gas ejected from the gas nozzles 16c impinges the sidewalls 18h and does not directly contact the inner surface of the knee-bag 14. Accordingly, it is possible to lower heat resistance of the knee-bag 14. The gas nozzles 16c face in opposite directions, so that gas ejected from the gas nozzles 16c impinges the sidewalls 18h and 18h to change the direction, and is guided into the knee-bag 14 to flow together, thereby inflating the knee-bag 14 smoothly.

Figure 8:
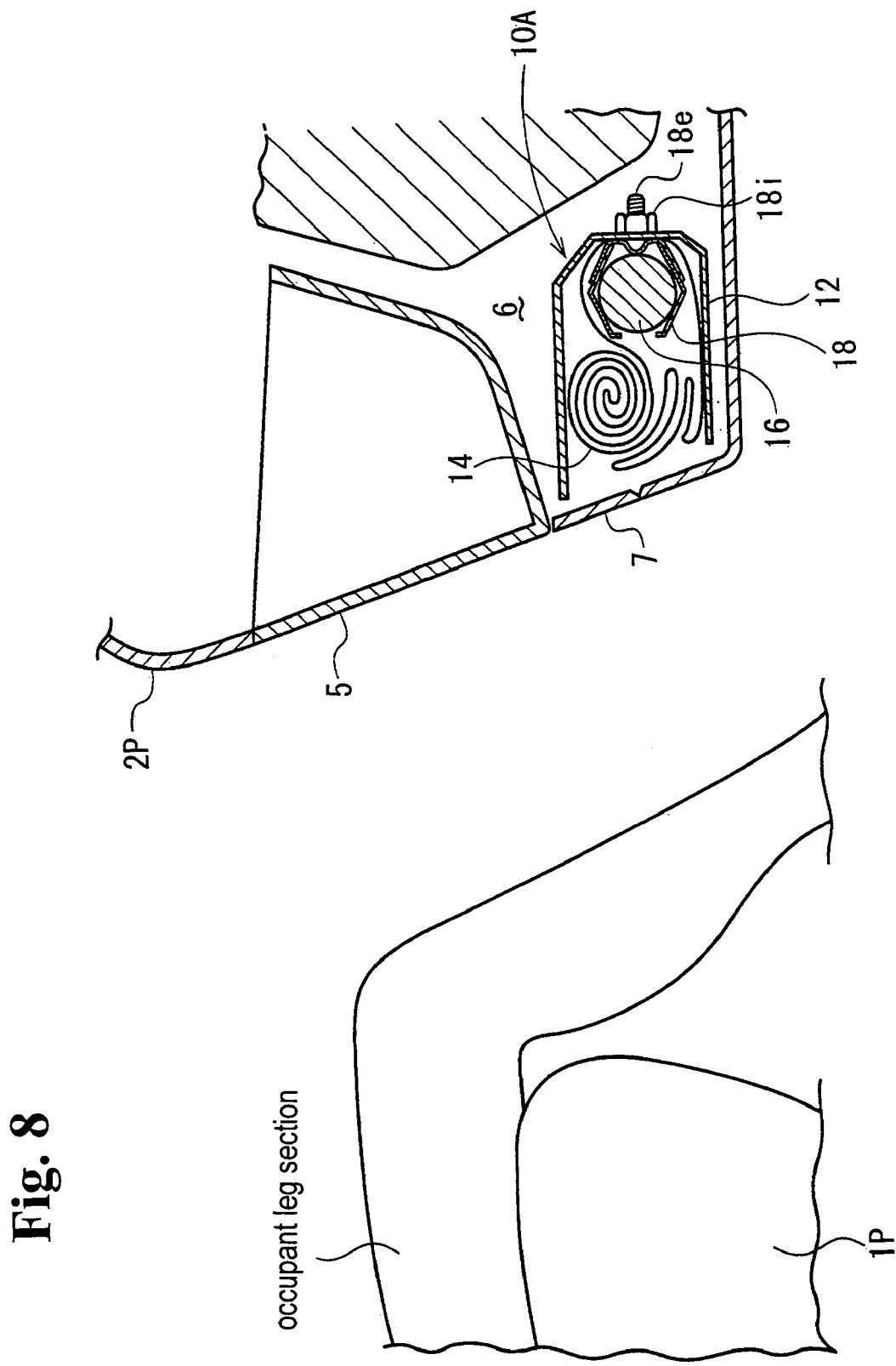
FIG. 8 is a longitudinal sectional view of a knee-bag module according to another embodiment of the present invention.

In the embodiment described above, the knee-bag module 10 is arranged at the lower portion of the driver seat instrument panel 2D (on the lower side of the steering column cover). The present invention is not limited thereto, and the knee-bag module may be arranged at a passenger seat as shown in FIG. 8. FIG. 8 is a longitudinal sectional view of a knee-bag module disposed at a passenger seat according to another embodiment of the present invention.

In the embodiment shown in FIG. 8, a knee-bag module 10A is arranged at a lower side of a passenger instrument panel 2P in front of a passenger seat, i.e., a space 6 under a glove box 5 provided in the passenger instrument panel 2P. Reference numeral 7 denotes a lower instrument panel covering the front opening of the retainer 12 of the knee-bag module 10A and the space 6. When the knee-bag 14 is inflated, the knee-bag 14 pushes a portion of the lower instrument panel 7 covering the front opening of the retainer 12 to break and open like a door.

The space 6 under the glove box 5 is small, and a pyro-inflator with a small size is used as the inflator 16. Accordingly, it is possible to make the knee-bag module 10A small so that the knee-bag module 10A can be accommodated in the space 6. A structure of the knee-bag module 10A is the same as that of the knee-bag module 10 shown in FIGS. 1 to 7.

According to the present invention, the knee-bag module may be arranged in front of a rear seat for protecting legs of an occupant in the rear seat. In this case, since the knee-bag module has a relatively small size, the knee-bag module can be mounted (accommodated) at a backside of a seat cushion (seat) or under a seat back (backrest).

The embodiments described above are examples of the present invention, and the present invention is not limited to the embodiments. For example, the number of gas outlets of the inflator may be three or more, or only one. When three or more gas outlets are provided, only some of the gas outlets may face in opposite directions, and all the gas outlets may face in different directions or in the same direction. Furthermore, the gas outlets may face plates or some of the gas outlets may not face plates.

The disclosure of Japanese Patent Application No. 2004-124416, filed on Apr. 20, 2004, is incorporated in the application.

While the invention has been explained with reference to the specific embodiments of the invention, the explanation is illustrative and the invention is limited only by the appended claims.

What is claimed is:

1. A knee-bag module comprising:
    a knee-bag to be inflated in front of a leg portion of a vehicle occupant, and
    a pyro-inflator attached to the knee-bag for inflating the same, said pyro-inflator ejecting only reactant gas of a gas generating material through at least one gas outlet, and
    an inflator holder for holding the inflator, said inflator holder having a plate facing the at least one gas outlet of the inflator and a front opening at a side of the plate angularly displaced from the plate around an axis of the inflator holder so that the gas ejected from the at least one gas outlet of the inflator first hits the plate, angularly changes an ejecting direction of the gas and flows through the front opening to inflate the knee-bag.

2. A knee-bag module according to claim 1, further comprising a cloth attached to the knee-bag at a portion receiving heat and mechanical load of the reactant gas.

3. A knee-bag module according to claim 2, wherein said cloth includes a flameproof cloth or a patch cloth surrounding the pyro-inflator.

4. A knee-bag module according to claim 1, wherein said inflator includes two gas outlets facing in opposite directions, said plate including a pair of side walls with the inflator therebetween and facing the gas outlets.

5. A knee-bag module according to claim 4, wherein said front opening is sandwiched between the side walls so that the reactant gas reflected by the side walls is ejected through the front opening.

6. A knee-bag module according to claim 1, wherein said pyro-inflator is structured such that when said pyro-inflator generates gas in a tank with an atmospheric pressure and a volume of 1.0 ft$^3$, an internal pressure of the tank reaches 35 to 65 kPa after 5 mili-seconds, 175 to 245 kPa after 15 miliseconds, and a maximum pressure of 240 to 300 kPa.

7. A knee-bag module according to claim 5, wherein said inflator holder comprises a body having a base and side portions extending upwardly from two sides of the base; and an upper section including said side walls overlapping with and connecting to the side portions, arch sections connecting the side walls, and inflator push pieces extending upwardly from the side walls with a space therebetween.

8. A knee-bag module according to claim 7, wherein said arch sections are spaced apart from each other along the axis of the inflator holder and are located at two longitudinal ends of the upper section and a middle thereof.

9. A knee-bag module according to claim 8, wherein said inflator push pieces are arranged to be spaced apart from each other with one arch section in the middle therebetween.

10. A knee-bag module according to claim 9, wherein said inflator holder further comprises a closing wall formed at one side thereof for receiving and holding a front end of the inflator.

11. A knee-bag module according to claim 10, wherein said body of the inflator holder has a convex step portion projecting inwardly of the inflator holder to support the inflator thereat.

\* \* \* \* \*